H. W. GROM & F. D. TERRY.
ELECTRICALLY CONTROLLED TEMPERATURE REGULATOR.
APPLICATION FILED JUNE 14, 1917.

1,267,069.

Patented May 21, 1918.

Inventors
Henry W. Grom
Fred. D. Terry
by
Hazard & Miller
Att'ys.

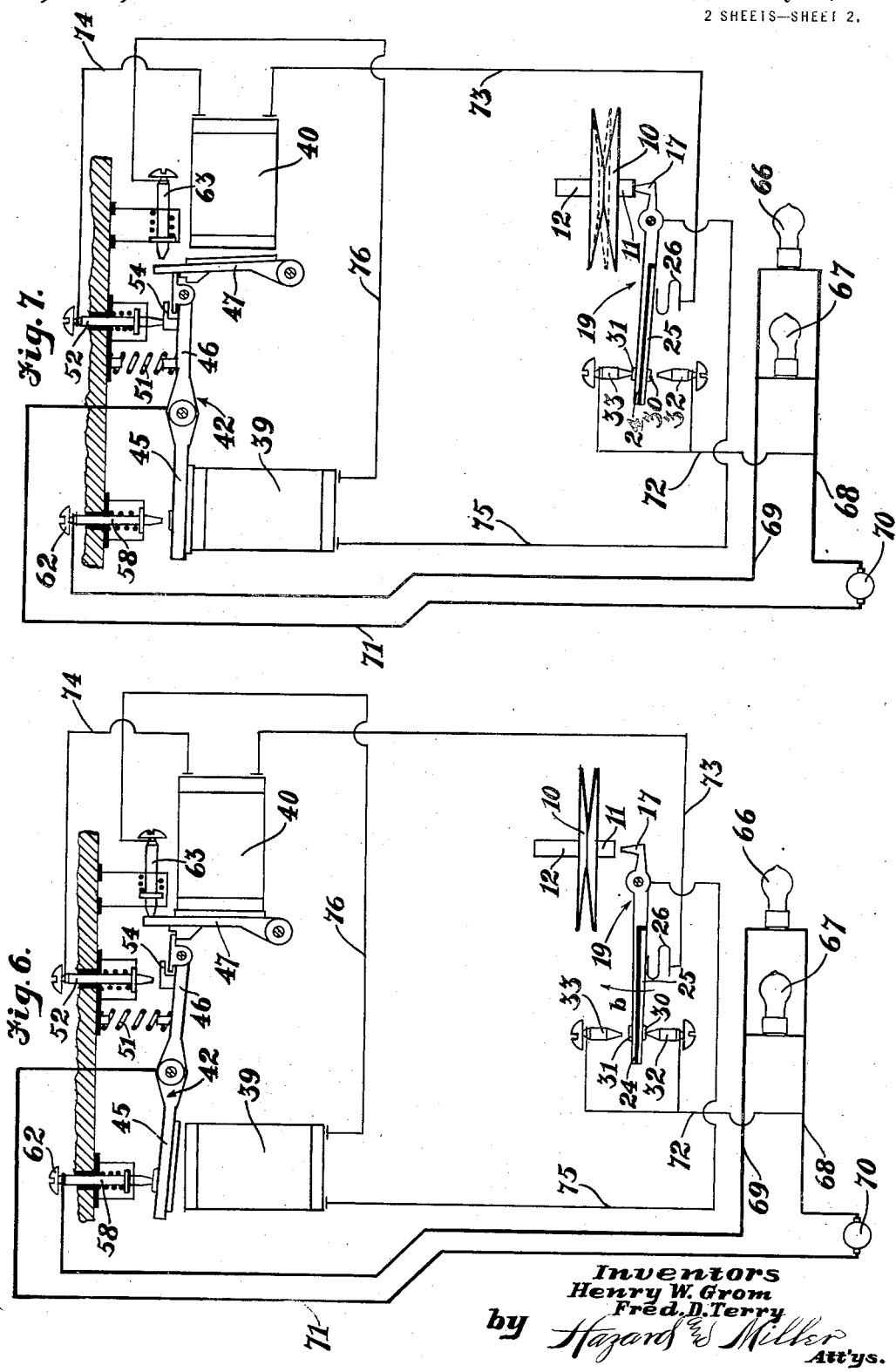

UNITED STATES PATENT OFFICE.

HENRY W. GROM, OF LOS ANGELES, AND FRED D. TERRY, OF PASADENA, CALIFORNIA.

ELECTRICALLY-CONTROLLED TEMPERATURE-REGULATOR.

1,267,069. Specification of Letters Patent. Patented May 21, 1918.

Application filed June 14, 1917. Serial No. 174,769.

*To all whom it may concern:*

Be it known that we, HENRY W. GROM and FRED D. TERRY, citizens of the United States, residing at Los Angeles and Pasadena, respectively, in the county of Los Angeles and State of California, have invented new and useful Improvements in Electrically-Controlled Temperature-Regulators, of which the following is a specification.

This invention relates to an electrical apparatus and particularly pertains to an electric contact switch and a thermostatic control therefor.

When electric circuits are controlled by a thermostat which produces its regulating action by expansion and contraction, it quite often happens that the electrical switch is slowly actuated and will produce an arc as it moves to and from its contacting position. It is the principal object of this invention to provide means whereby a slowly moving electrical switch will not arc.

Another object of this invention is to provide a combined thermostat and switch which are fitted with regulating means for insuring that an exact temperature may be maintained by the thermostat and that the electric current will be accurately controlled thereby.

It is a further object of this invention to provide a thermostat and electric control switch, both of which are simple in their construction and act in combination to positively produce the results desired.

Other objects will appear hereinafter.

The invention is illustrated, by way of example, in the accompanying drawings in which:

Fig. 6 is a view in diagram illustrating the relation of the various elements of the apparatus when the thermostat is contracted.

Fig. 7 is a view similar to Fig. 6 illustrating the magnet and thermostat units when the thermostat is expanded, and particularly disclosing the electric circuits.

Figure 2:
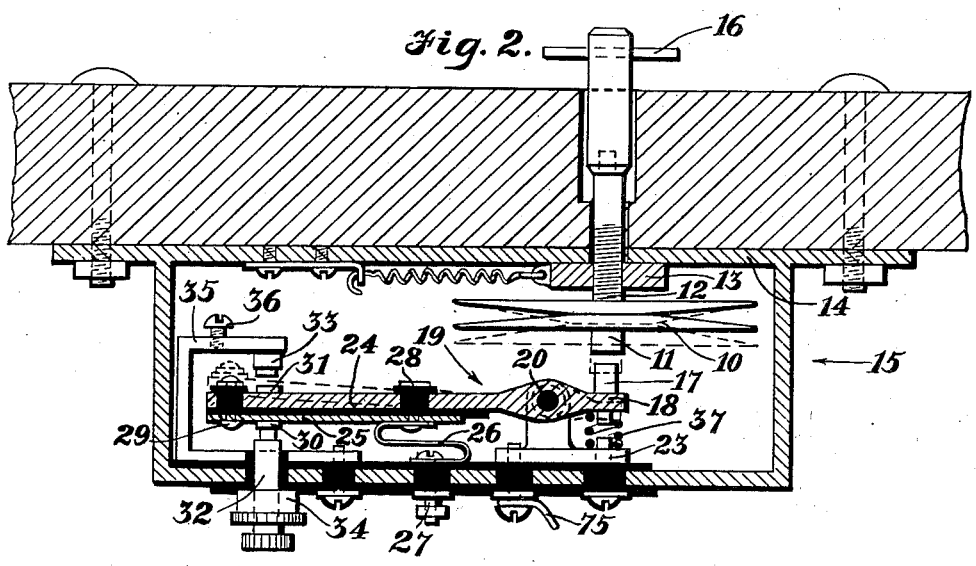
Fig. 2 is a view in section and elevation illustrating the switch and thermostat unit and particularly disposes the extreme positions of these members.
Figure 3:
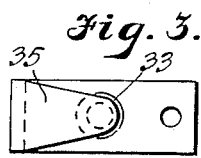
Fig. 3 is a view in plan illustrating the switch contact bar.
Figure 4:
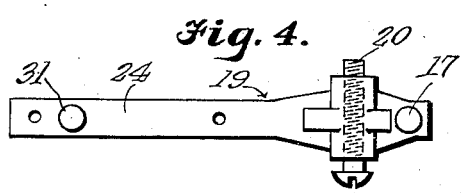
Fig. 4 is a view in plan illustrating the switch arm.
Figure 5:
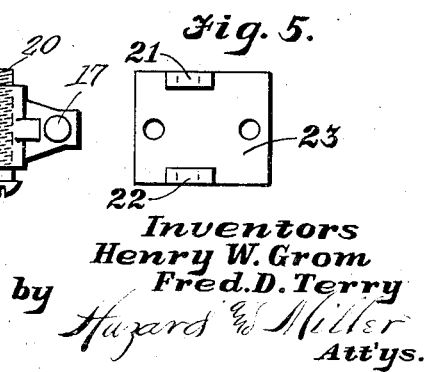
Fig. 5 is a view in plan illustrating the mounting provided the switch arm.

Referring more particularly to the drawings, 10 indicates a thermostat, which may be of any desired design and is here shown as formed with disk expansion members, at the opposite sides of which are mounted shafts 11 and 12. These shafts are vertically alined and the shaft 12 is fitted with threads which permit it to be mounted within a nut 13. This nut bears against the inner face of the top wall 14 of the thermostat case 15. An extension of the shaft 12 is provided with a turning pin 16 which permits the shaft to be rotated in relation to the nut and in turn causes the thermostat to be raised and lowered. The lower shaft portion 11 extends downwardly beneath the thermostat member and is adapted to be brought into contact with a pressure pin 17. This pin is secured upon and projects upwardly from the short arm 18 of a switch lever 19. As shown in Fig. 2 of the drawings, the switch lever is mounted for vertical swinging movement upon a pivot pin 20 secured within lugs 21 and 22 of a pivot block 23.

The switch lever 19 and the block 23 are disposed upon the floor of the case 15 and insulated therefrom. The long arm 24 of the lever extends horizontally and is fitted with a separate contact plate 25 which is secured to and insulated from the under face of the lever. At the end of the plate nearest the block 23 a resilient conduit 26 is positioned and is secured at one end to a binding post 27 which extends through the floor of the case 15, and at its opposite end by a rivet 28 which holds it against the plate. The forward end of this plate is secured to the lever by a rivet 29 which is also insulated from the lever. Mounted in vertical alinement with each other upon the plate and the lever, respectively, are oppositely extending contact buttons 30 and 31. These buttons are so arranged as to alternately make contact, the button 30 engaging a contact pin 32 and the button 31 a pin 33. The pin 32 is adjustably mounted within the floor of the case and extends upwardly therethrough, its outer circumference being threaded to accommodate a lock-nut 34 by which its point may be raised and lowered in relation to the button 30. The contact pin 33 is secured to and extends downwardly from the metallic contact support 35 through which the pin 32 is also mounted. This support, as here shown, is U-shaped and is adapted to encircle the end of the arm 24. A binding screw 36 is mounted upon this member to receive a conduit which will hereinafter be designated. The lever 19 is provided with an expansion coil spring 37 which normally causes the contact button 30 and the pin 32 to be in engagement with each other, and the pin 33 and contact 31 separated.

Figure 1:
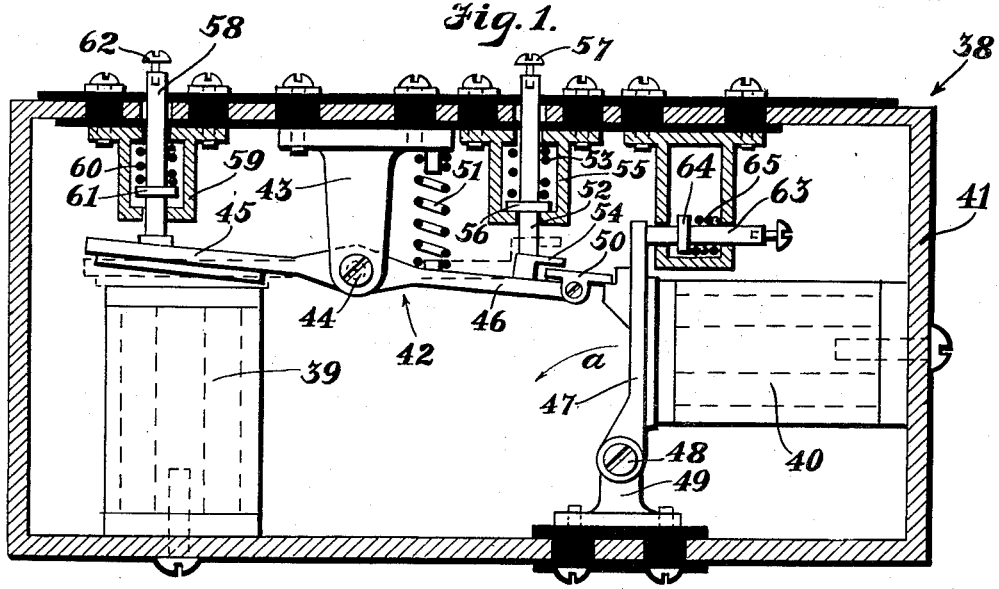
Figure 1 is an enlarged view in section and elevation illustrating the magnet unit of the apparatus and particularly discloses the relation of the parts when the thermostat is in its two extreme positions.

A magnet unit 38 is in electrical connection with the thermostat switch and is particularly shown in Fig. 1. This unit consists of a vertically disposed electric magnet 39 and a horizontally disposed magnet 40, both of which are inclosed within a magnet case 41. A rocker arm 42 is pivotally mounted upon a bracket 43 extending downwardly from the top of the case and insulated therefrom. This arm is adapted to swing horizontally upon a rocker pin 44 and thus to permit the portion 45 to overhang the upper end of the magnet 39, while the opposite end 46 is adapted to swing in front of the magnet 40. Interposed between the end 46 and the magnet 40 is an oscillating plate 47 pivotally mounted upon a screw 48 held within a suitable bracket 49 to the bottom of the case 41. The oscillating plate is adapted to be drawn toward the magnet 40 when it is energized and to be locked in this position by a detent 50 pivotally secured at the end 46 of the rocker arm 42. The rocker arm is normally held in this position by an expansion spring 51, which is interposed between the base of the bracket 43 and the upper face of the end 46 of the rocker arm 42. This action is also aided by a reciprocating contact pin 52 held in its lowermost position by a spring 53 which causes it to bear against a contact finger 54 upon the rocker arm. This pin is mounted within a small tubular housing 55 and is limited in its downward movement by a collar 56. The upper end of the pin is insulated from and extends through the top of the case 41 where it is provided with a screw 57. This screw is adapted to clamp a conduit in position.

The opposite end 45 of the rocker arm 42 is normally in contact with a reciprocating contact stem 58 which is secured within a tubular housing 59 and normally bears against the arm 42 as it is depressed by a spring 60. This spring acts against a collar 61 by which the downward movement of the stem is limited. It will also be understood that a binding screw 62 is mounted in the end of the stem 58 for the reception of an electrical conduit. The oscillating plate 47, when in its normal position, as indicated in Fig. 1 of the drawings, is in contact with a horizontally slidable contact pin 63 having a shoulder 64 against which an expansion spring 65 bears. This permits the end of the pin to be firmly held against the end of the plate 47 except when the plate is released by the rocker arm 42 and allowed to swing outwardly in the direction of the arrow —a—.

The thermostat unit is positioned within a device which is to be heated and is here shown as fitted with electric heating elements 66 and 67. These elements are connected to electric conduits 68 and 69. The conduit 68 leads to a source of electrical power 70 while the conduit 69 is secured by the screw 62 to the contact stem 58, particularly illustrated in Fig. 1. Normally the current passes from the conduit 69 along the rocker arm and returns to the source of supply along a conduit 71. Thus when the magnet unit is in the position indicated in Fig. 6 a current of electricity will be established through the heating elements. Connecting with the conduit 68 is a conduit 72 which communicates with the contact member 33 and the adjustable contact pin 32 mounted upon the frame 35. As previously described, the adjustable contact 32 is in engagement with the contact button 30 secured to the plate 25 and thus permits the current to pass through the resilient conductor 26 and along a conductor 73 to one binding post of the magnet 40. The opposite binding post of this magnet connects with the reciprocating contact pin 52 by means of a conductor 74. Further examination of the diagrams will disclose the fact that the base block 23 is electrically connected by a conductor 75 with one binding post of the vertical magnet 39. The opposite binding post of this magnet is fitted with a conductor 76 which leads to the horizontally reciprocable pin 63 normally in contact with the end of the oscillating plate 47.

In operation, the heating elements 66 and 67 are supplied with electricity from the source of supply 70 along conductors 68 and 69, it being understood that the conductor 69 completes its circuit to the source of supply through pin 58, the portion 45 of the rocker arm 42, and the conductor 71. As the heating elements increase the temperature of the device, the thermostat disks 10 will expand and cause the lower shaft 11 to engage the pressure pin 17 upon the short end of the switch lever 19. As this expansion takes place, the switch lever 19 will be swung upwardly at its outer end, as indicated by the arrow —b— in Fig. 6 of the drawings. This will cause the contact button 30 to move away from the adjustable pin 32 and permit the contact button 31 to engage the stationary pin 33. Current will then pass from the conductor 68 along the conduit 72 through the pin 33 to the portion 24 of the switch lever 19 and thence along conductor 75 to one binding post of the magnet 39. This current will then pass through the magnet along conductor 76 to the contact pin 63. From this point it will pass through the oscillating plate 47 along the rocker arm 42 and return to the source of power along conductor 71. At the instant this circuit is completed, the magnet 39 will be energized and will cause the end 45 of the rocker arm 42 to swing downwardly against the end of the magnet 39. When the rocker arm is thus swung by the action of the magnet 39, the oscillating plate 47 will swing outwardly from the end of the magnet 40 and the various elements of the magnet unit will assume the position indicated in Fig. 7. In this position the end 45 of the rocker arm 42 will be swung away from the contact stem 58 and will discontinue the circuit which includes the heating elements. It will be noted that instantly the entire electrical system will be dead and that an arc at any point would be impossible.

The entire electrical wiring system will remain dead until the thermostat has cooled sufficiently to allow the switch member 19 to assume its original position, as indicated in Fig. 6. At the instant this position is assumed, an electric circuit will be established from the conductor 68 along conductor 72 to the frame 35 and then through the adjustable contact pin 32 to the plate 25. The current will then travel through the resilient conductor 26 to the magnet 40 along the conductor 73. This magnet circuit will be completed along conductor 74 to the pin 52 and then through the contact 54 and the arm 42 to the return lead wire 71. It will be noted that due to the relation of the end 46 of the rocker arm 42 and the oscillating plate 47, the oscillating plate will be locked in position against the end of magnet 40 when the heating elements are electrically connected and the rocker arm will be locked against its magnet when said elements are disconnected from the source of electrical supply. When the magnet 40 is energized the oscillating plate 47 will swing toward the magnet 40 and will permit the spring 51 to restore the rocker arm 42 to its original position. As this takes place, the circuit from the magnet along conductor 74 to the pin 52 and thence along the rocker arm 42 to the conductor 71 will be broken. This will permit the rocker arm 42 to lock the oscillating plate 47 in position with the contact pin 63 against the end of the plate, thus uniting all of the required electrical conductors prior to the expansion of the thermostat and a discontinuance of electricity to the heating elements.

It will thus be seen that the apparatus here disclosed will positively make and break electric circuits without possibity of an arc between the separating members, thus eliminating all danger of fire and conserving the electric current used.

While we have shown the preferred construction of our electrically controlled temperature regulator as now known to us, it will be understood that various changes in the combination, construction and arrangement of parts may be made by those skilled in the art without departing from the spirit of our invention.

We claim:

1. In an electrical apparatus of the class wherein a heating element is adapted to be energized by a primary electric circuit and will affect a thermostat which actuates a two-way switch controlling first and second secondary circuits and indirectly controlling the primary circuit, the combination with said circuits, of a first secondary circuit magnet, a second secondary circuit magnet, a main switch arm actuated by the first secondary circuit magnet to break the primary circuit, spring means in opposition thereto to normally establish said circuit, a lock switch plate pivotally disposed adjacent the second magnet and normally held thereagainst by the end of the main switch, whereby the first secondary circuit will be completed, means whereby completion of said first secondary circuit will break the primary circuit and establish the second secondary circuit, and means whereby completion of the second secondary circuit will allow the primary and first secondary circuits to be reëstablished.

2. The combination with a two-way electric switch and a first and second secondary circuit controlled thereby, of an oscillating switch member having oppositely extending arm portions, a primary circuit controlled by said switch member, a spring normally closing said primary circuit, a magnet disposed at right angles to one arm of said switch member and included within the first secondary circuit to cause the primary circuit to be broken when said magnet is energized, a pivoted switch lock member disposed at right angles to the opposite end of the switch member, a second magnet included within said second secondary circuit and adapted to affect said switch lock, means whereby the switch lock will support the switch member to hold the primary circuit open against the opposition of the switch spring, means whereby energization of the second magnet will release the switch member and close the first secondary circuit exclusive of the two-way switch, and means whereby the switch member will complete the second secondary circuit exclusive of the two-way switch when the first magnet is energized.

In testimony whereof we have signed our names to this specification.

HENRY W. GROM.
FRED D. TERRY.